United States Patent [19]
Barna
[11] 3,968,072
[45] July 6, 1976

[54] ASBESTOS FIBER AND ORGANIC POLYMERIC BINDER HEAT REACTION PRODUCTS AND METHOD OF FORMING SAME

[75] Inventor: James Julius Barna, Somerville, N.J.
[73] Assignee: Johns-Manville Corporation, Denver, Colo.

[22] Filed: July 10, 1974
[21] Appl. No.: 487,415

Related U.S. Application Data

[63] Continuation of Ser. No. 255,904, May 22, 1972, abandoned, which is a continuation of Ser. No. 79,625, Oct. 9, 1970, abandoned.

[52] U.S. Cl. .............................. 260/40 R; 162/155; 260/42; 260/42.47; 260/42.49; 264/83
[51] Int. Cl.[2] .............................. C08K 7/12
[58] Field of Search .............................. 162/155; 260/42.47, 260/42, 40 R; 264/83

[56] References Cited

UNITED STATES PATENTS

| | | | |
|---|---|---|---|
| 2,383,604 | 8/1945 | Leistensnider et al. | 260/42.47 |
| 2,715,066 | 8/1955 | Feigley | 260/42.47 |
| 2,769,713 | 11/1956 | Wilson | 162/155 |
| 3,546,158 | 12/1970 | Champion | 260/42.49 |

*Primary Examiner*—James H. Derrington
*Attorney, Agent, or Firm*—Robert M. Krone; Joseph J. Kelly; James W. McClain

[57] ABSTRACT

Method of producing distinctive thermal reaction products of combinations of asbestos fibers with vinyl-containing organic polymer material having improved and unique, lasting physical and electrical insulating properties among others, by means of heating the combined asbestos fiber with vinyl-containing organic polymeric material in an oxidizing atmosphere, and the resultant enhanced asbestos-polymeric material heat reaction products and electrical insulating materials provided thereby.

7 Claims, No Drawings

ASBESTOS FIBER AND ORGANIC POLYMERIC BINDER HEAT REACTION PRODUCTS AND METHOD OF FORMING SAME

BACKGROUND OF THE INVENTION

This is a continuation of application Ser. No. 255,904, filed May 22, 1972, now abandoned, which is in turn a continuation of application Ser. No. 79,625, filed Oct. 9, 1970, and now abandoned.

Common electrical transmitting or consuming equipment comprising rotating apparatus, transformers, appliances, etc., operates more economically at elevated temperatures. A primary restricting factor however in limiting their operation temperatures is the heat stability or level of endurance of their component insulating materials. Electrical insulating materials of high inorganic content or compositions would generally be most suitable therein from the stand point of temperature stability or endurance, resistance to hot wire penetration or cut through and flammability, but the use of inorganic insulations has been curtailed especially in domestic products by their relatively high cost and poor strength characteristics. Typically organic materials such as kraft paper or polyester film are therefore used as electrical insulations in many such applications for want of a more apt inorganic insulation, particularly as to strength and economy.

SUMMARY OF THE INVENTION

This invention relates to asbestos materials such as paper, felted board, etc. so formed or modified as to attain unique permanent physical and electrical properties therein whereby they provide economical and highly effective electrical insulating components for many typical electrical applications and appliances.

It is the primary objective of this invention to provide an essentially inorganic material of asbestos fiber for electrical insulating applications in the form of paper, felted board or other apt constructions possessing lasting increased physical strength and stiffness including high tensile strength and tear resistance, improved electrical impedance to the extent of several magnitudes as well as enhanced and stabilized dielectric constant, dissipation factor and volume resistivity, significantly greater moisture resistance, and better flame resistance, among other attributes, all at economically feasible costs.

DESCRIPTION OF THE PREFERRED EMBODIMENT

The improved and distinctive asbestos material of this invention comprises the heat reaction products derived from asbestos fiber in combination with vinyl-containing organic polymeric materials formed by a method of heat treating the combined fibers and vinyl-containing polymers while exposed to an oxidizing atmosphere.

Electrical insulating components or products which are predominantly composed of asbestos fiber are typically produced in the form of paper and millboard or similar sheet-like or board-like bodies of interfelted fibers obtained from the random intermingling and consolidation of substantially individually water or air suspended fibers by means of filtration accumulation techniques as in common commercial paper and board making or fiber felting manufacturing procedures. Although some commercial asbestos fiber electrical insulating papers etc. are thus produced essentially without any binder components or other added ingredients, this type of product more often generally includes a binder of inorganic composition such as a phosphate or one of organic composition such as starch or a polymeric material. Such binders, especially those which are substantially insoluble in water are normally introduced or applied to the fibers by dispersion in finally divided form throughout the suspending process water of the papermaking process to achieve maximum distribution over the fiber, for example, as an emulsion of polymeric binder such as an elastomer latex, although many types of binders can alternatively be subsequently injected into the consolidated fibrous material by impregnation with a solution or emulsion thereof. Illustrations of such prior art means are provided in U.S. Patent Nos. 2,541,273, 2,467,540, 2,567,558, 2,567,559, and 2,977,248, among numerous other patents in this field.

This invention, nevertheless, deals with such asbestos materials which are predominantly composed of combinations of asbestos fibers with a vinyl-containing organic polymer binder or other material regardless of their physical configuration such as construction, particularly comprising those commonly referred to as paper, board, and the like sheets, regardless of the measures utilized in their manufacture, such as fourdrinier machine, air felting, etc. and the means or form of binding administration, that is applied commensurate with the collecting and intermingling of the fibers into the product or injected therein subsequenttly and whether in the form of an emulsion, solution, melt or the like.

This basic combination of essential components for the effective attainment of the benefits of this invention with the objective of providing an electrical insulation of high inorganic content comprises approximately 95 to approximately 60% by weight of the product of asbestos fiber together with approximately 5 to approximately 25% by weight of the product of vinyl-containing organic polymeric binder or the like material. To attain maximum asbestos or inorganic content, the preferred proportions comprise about 95 to about 85% by weight of asbestos with about 5 to about 15% by weight of vinyl-containing polymer, for most applications, and typically about 90% to 10%. Non-essential fiber such as reinforcing fibers of organic composition or strands to strengthen the asbestos fiber, and/or fillers, etc. can additionally be included to achieve ancillary effects such as reinforcement, processing aids, bulking, etc. in amounts up to about 25% by weight of the product.

The measures of this invention for enhancing physical, electrical and other attributes relating to electrical insulating applications of the combination of asbestos fiber and vinyl-containing organic polymeric material consist of subjecting the same to elevated temperatures while exposed to an oxidizing atmosphere, the time and temperature conditions specifically comprising the range of at least about 120°C, up to about 250°C and for a period of at least 1 minute. Preferred thermal reaction conditions comprise temperatures of about 130°C to about 200°C over a period ranging from approximately 15 minutes to approximately 50 hours or more in an oxidizing atmosphere. Typical conditions generally apt for paper-like materials under most circumstances comprise temperatures of about 175°C for 2 or 3 hours.

Generally, the temperature and duration thereof vary somewhat inversely proportional with each other whereby a higher temperature requires briefer terms and conversely lower temperatures require greater terms. For instance, with a free hanging overall exposed single thin sheet of material a treatment of 130°C over a period of 30 hours provides essentially the same result as 170°C for the term of 4 hours. Moreover, the mass of the material — for example, thickness of paper or board — and whether or not the body is heated while exposed on all surfaces such as a single hanging sheet or in a roll or multi-unit package as a coil of paper or stack of boards, all constitute factors which influence the duration of the heat treatment since additional time must, of course, be allowed to penetrate the mass or for the material within and throughout the package or unit to reach treatment temperatures.

The heat treatment may be administered with any suitable apparatus such as an oven or other heat generating or applying mechanism which is capable of attaining and maintaining the temperature conditions while providing an ambient oxidizing atmosphere such as that provided by ordinary atmospheric air. This requirement of the presence of an oxidizing atmosphere is essential in that no change other than simply thermal decomposition of the organic polymeric material, depending upon temperatures applied, is attained by applying the heat treatment in an inert atmosphere such as a nitrogen atmosphere.

The asbestos fiber component of this invention comprises both the chrysotile and amphibole variety, the latter class including amosite, anthophyllite, crocidolite, and tremolite. Chrysotile, however, is preferred for its generally superior properties for electrical applications.

The vinyl-containing organic polymeric material comprises several common binder resins and/or elastomers having available vinyl $CH_2=C(H \text{ or } R)$ groups in their structure including those of the diolefin or diene monomers of isoprene and butadiene, styrene, acrylonitrile and vinyl chloride, such as polymers of acrylonitrile-butadiene-styrene, butadiene-acrylonitrile, butadiene-styrene, chloroprene and polyvinyl chloride, Preferably, a latex or emulsion formed of these materials is applied to the asbestos fiber in a conventional papermaking or board forming operation since the latex form is most convenient, effective and commonly utilized in typical commercial operations. Nevertheless, other techniques may be utilized, such as impregnation with a solvated solution thereof, as a means of obtaining the base material of the combination of asbestos fiber and vinyl-containing polymeric material thereon for the enhancing treatment of this invention which essentially constitutes the application of the given temperature conditions within an oxidizing atmosphere. No curing agents or vulcanizing ingredients are needed for the purposes of this invention.

The following comprise specific illustrations of various aspects of this invention demonstrating its application to asbestos-organic vinyl-containing polymeric combinations and the unique enhancing effects achieved thereby.

Two asbestos products identified hereinafter as exaples I and II comprising chrysotile asbestos fiber papers each containing as a binder a terpolymer of acrylonitrile butadiene styrene and samples of simply the same terpolymer binder material by itself were each evaluated by solvent extraction both before and after the heat treating in an oxidizing atmosphere measures of this invention to demonstrate the conversion and profound effects derived from the method thereof.

| Example I | Example II |
|---|---|
| 90% chrysotile fiber | 82% chrysotile fiber |
| 10% terpolymer latex | 8% polyester fiber |
| | 10% terpolymer latex |

The binder in latex or emulsified in water form of the asbestos fiber product of each example and that tested alone in all cases was a terpolymer of an acrylonitrile butadiene styrene product of Standard Brands. Samples of the latex binder alone were cast on glass plates and divided in two sections with one section of heat treated under the same conditions as the asbestos products of example I and II. Samples of each example I and example II, respectively, and of the terpolymer acrylonitrile butadiene styrene binder were all heat treated pursuant to the conditions of this invention, namely, 190°C for a period of 3.5 hrs. Weighed portions of samples of all materials both untreated and heat treated were then extracted with N,N-dimethylformamide by refluxing therewith over a period of 24 hours whereupon the extracted material was then evaporated on a steam bath and weighed. The percent extracted from the asbestos paper products of examples I and II both before and after heat treatment and the percent extracted from the latex binder along both before and after heat treatment are given in the following table.

Table I

| Sample | % Extracted with N,N-dimethylformamide Untreated | Heat Treated 3.5 hrs. at 190°C |
|---|---|---|
| Example I | 6.7 | 1.6 |
| Example II | 7.0 | 1.6 |
| Terpolymer Latex | 25.8 | 39.6 |
| Terpolymer Latex | 20.5 | 36.1 |

This demonstrates that the amount extractable from the heat treated combination of asbestos and latex drops sharply following the heat treatment but that the amount extracted from the heat treated latex alone increases indicating that the measures of the invention accomplish more than simply initiating a cure or extending polymerization.

The progressive effects of the measures of this invention and changes in significant characteristics of the treated product, such as electrical properties, stiffness, tensile strength and stretch, are demonstrated by the following data. All test samples, both untreated standards and treated materials, consisted of an asbestos paper product having the composition of 82% chrysotile fiber, 8% polyester fiber, 10% latex of a terpolymer of acrylonitrile butadiene styrene.

EXAMPLE III

Samples of asbestos paper of the given composition of Example II, but in varying thicknesses of 0.005 inch, 0.007 inch and 0.01 inch were evaluated under like conditions to determine the change in Clark stiffness ("Tappi-T451), tensile strength, and percentage of stretch, as the period of heat treatment of this invention progressed. Also given are the electrical properties of each paper sample at the varying levels of treatment, including dielectric constant )ASTM-D150), dissipation factor (ASTM-D150), and volume resistivity (ASTM-D257). The ASTM dielectric constant and dissipation factor tests were run at 60 Hertz and the volume resistivity tests of ohms centimeter in all determinations of this specification, unless stated otherwise. Also all electrical evaluations were made upon both untreated and heated treated samples following conditioning at a temperature of 23°C and relative humidity of 50%, unless stated otherwise.

EXAMPLE IV

A 12 inch wide, 200 yard in length roll of asbestos paper of the same composition as that in Examples II and III in a thickness ranging from 4.5 to 6.0 mils with an average of 5.3 mils were heat treated as a roll in a forced air circulating oven at 135°C for 30 hours. This paper both in untreated form and at given lineal increments measured along its length upon unwinding following the heat treatment was tested to ascertain the changes in its electrical properties attributable to the treatment throughout its length. The electrical properties were found to be relatively uniform along the length of the paper treated in roll form, and variations

TABLE 2

Paper 0.005 inch Thick

| HRS. AT 135°C | STIFFNESS | TENSILE lbs/in. | STRETCH % | DIELECTRIC CONSTANT,60Hz | DISSIPATION FACTOR,60Hz | VOLUME RESISTIVITY ohm-cm |
|---|---|---|---|---|---|---|
| Untreated Standard | 19 | 12.3, 12.3 | 4.6,4.6 | 4.32 | 0.257 | $3 \times 10^{11}$ |
| 4 | 30 | 15.0, 15.2 | 2.6,2.6 | 4.05 | 0.163 | $2.41 \times 10^{13}$ |
| 8 | 37 | 15.2, 15.2 | 1.6,1.6 | 3.62 | 0.136 | $5.22 \times 10^{13}$ |
| 12 | 61 | 16.6, 15.6 | 0.8,0.8 | 2.68 | 0.123 | $9.45 \times 10^{13}$ |
| 16 | 76 | 18.0, 16.8 | 0.6,0.6 | 2.86 | 0.117 | $1.08 \times 10^{14}$ |
| 20 | 85 | 17.3, 16.8 | 0.5,0.5 | 2.39 | 0.103 | $1.25 \times 10^{14}$ |
| 24 | 81 | 16.6, 17.0 | 0.5,0.5 | 2.49 | 0.118 | $1.36 \times 10^{14}$ |
| 28 | 84 | 16.8, 15.6 | 0.5,0.4 | 2.40 | 0.100 | $1.32 \times 10^{14}$ |
| 32 | 84 | 17.1, 18.2 | 0.5,0.6 | 2.38 | 0.101 | $1.10 \times 10^{14}$ |
| 36 | 79 | 16.6, 16.8 | 0.5,0.5 | 2.17 | 0.0955 | $1.01 \times 10^{14}$ |
| 40 | 81 | 17.5, 17.4 | 0.5,0.5 | 2.15 | 0.115 | $1.28 \times 10^{14}$ |
| 44 | 75 | 16.8, 17.0 | 0.5,0.5 | 2.31 | 0.104 | $1.21 \times 10^{14}$ |
| 48 | 84 | 17.3, 17.1 | 0.5,0.5 | 2.60 | 0.0995 | $1.06 \times 10^{14}$ |

TABLE 3

Paper 0.007 inch Thick

| HRS. AT 135°C | STIFFNESS | TENSILE lbs/in. | STRETCH % | DIELECTRIC CONSTANT,60Hz | DISSIPATION FACTOR,60Hz | VOLUME RESISTIVITY ohm-cm |
|---|---|---|---|---|---|---|
| Untreated Standard | 38 | 16.7, 18.2 | 3.5, 3.8 | 9.77 | 0.558 | $1.01 \times 10^{10}$ |
| 4 | 68 | 20.5, 20.3 | 2.4, 2.2 | 4.03 | 0.165 | $3.0 \times 10^{13}$ |
| 8 | 75 | 22.8, 21.5 | 1.7, 1.6 | 4.12 | 0.161 | $5.43 \times 10^{13}$ |
| 12 | 117 | 25.2, 25.0 | 0.8, 1.0 | 2.91 | 0.151 | $8.85 \times 10^{13}$ |
| 16 | 172 | 24.4, 25.0 | 0.6, 0.6 | 3.12 | 0.127 | $1.22 \times 10^{14}$ |
| 20 | 172 | 24.5, 25.0 | 0.5, 0.6 | 3.01 | 0.120 | $1.26 \times 10^{14}$ |
| 24 | 184 | 25.2, 25.0 | 0.6, 0.5 | 2.93 | 0.118 | $1.45 \times 10^{14}$ |
| 28 | 182 | 24.2, 21.7 | 0.6, 0.4 | 2.88 | 0.118 | $1.42 \times 10^{14}$ |
| 32 | 182 | 25.0, 25.0 | 0.5, 0.5 | 2.69 | 0.118 | $1.29 \times 10^{14}$ |
| 36 | 194 | 25.6, 25.0 | 0.6, 0.6 | 2.91 | 0.120 | $1.38 \times 10^{14}$ |
| 40 | 194 | 24.7, 25.6 | 0.5, 0.6 | 2.49 | 0.102 | $1.60 \times 10^{14}$ |
| 44 | 199 | 23.0, 25.2 | 0.5, 0.6 | 3.02 | 0.124 | $1.22 \times 10^{14}$ |
| 48 | 197 | 24.5, 24.2 | 0.5, 0.5 | 3.06 | 0.119 | $1.39 \times 10^{14}$ |

TABLE 4

Paper 0.010 inch Thick

| HRS. AT 135°C | STIFFNESS | TENSILE LBS/IN. | STRETCH % | DIELECTRIC CONSTANT,60Hz | DISSIPATION FACTOR,60Hz | VOLUME RESISTIVITY ohm-cm |
|---|---|---|---|---|---|---|
| Untreated Standard | 57 | 21.5, 21.1 | 5.3, 5.2 | 13.1 | 0.633 | $9.3 \times 10^{9}$ |
| 4 | 108 | 23.2, 24.4 | 2.5, 2.5 | 5.18 | 0.183 | $1.82 \times 10^{13}$ |
| 8 | 120 | 26.8, 24.5 | 1.8, 1.4 | 4.75 | 0.178 | $4.73 \times 10^{13}$ |
| 12 | 244 | 30.5, 29.4 | 0.8, 0.6 | 3.87 | 0.149 | $7.60 \times 10^{13}$ |
| 16 | 328 | 34.2, 32.0 | 0.6, 0.6 | 3.60 | 0.143 | $1.0 \times 10^{14}$ |
| 20 | 337 | 32.3, 33.4 | 0.5, 0.6 | 3.03 | 0.113 | $1.42 \times 10^{14}$ |
| 24 | 369 | 33.6, 32.4 | 0.5, 0.5 | 3.25 | 0.120 | $1.27 \times 10^{14}$ |
| 28 | 337 | 35.8, 30.0 | 0.5, 0.4 | 3.47 | 0.130 | $1.21 \times 10^{14}$ |
| 32 | 359 | 32.6, 30.6 | 0.5, 0.4 | | | |
| 36 | 343 | 30.2, 32.0 | 0.4, 0.4 | 3.57 | 0.137 | $1.02 \times 10^{14}$ |
| 40 | 379 | 28.6, 31.4 | 0.4, 0.4 | 3.08 | 0.123 | $1.56 \times 10^{14}$ |
| 44 | 362 | 30.0, 33.7 | 0.4, 0.5 | 3.35 | 0.132 | $1.18 \times 10^{14}$ |
| 48 | 356 | 33.6, 36.0 | 0.6, 0.6 | 3.24 | 0.122 | $1.29 \times 10^{14}$ |

in thickness may account for some of the variations in the resultant electrical properties. The properties of the untreated material and at given points along the length of the sheet upon unrolling following the application of the heat treatment to the roll are given in the following table. The dielectric constant was determined by ASTM test D150, the dissipation factor by ASTM test D150 , and the volume resistivity by ASTM test D257, as stated hereinbefore.

TABLE 5

| Area of Roll Tested | Standard Untreated | Heat Treated 30 hours at 135°C 0 ft | 100 ft | 200 ft | 300 ft | 400 ft | 500 ft |
|---|---|---|---|---|---|---|---|
| Dielectric Constant,60 Hz | | | | | | | |
| Std 10 days/23C/50%RH | 8.2 | 2.7 | 2.5 | 2.4 | 2.6 | 2.5 | 2.5 |
| Humid 18 Hr/23C/96%RH | 50.7 | 4.9 | 3.8 | 3.9 | 3.3 | 3.1 | 3.5 |
| Dissipation Factor,60 Hz | | | | | | | |
| Standard 10 days/23C/50%RH | 0.49 | 0.11 | 0.10 | 0.09 | 0.09 | 0.09 | 0.09 |
| Humid 18 hr/23C/96%RH | 2.61 | 0.42 | 0.29 | 0.34 | 0.28 | 0.22 | 0.28 |
| Volume Resistivity, ohm-cm | | | | | | | |
| Standard 10 days/23C/50%RH | $1.1 \times 10^{10}$ | $8.4 \times 10^{13}$ | $1.1 \times 10^{14}$ | $1.2 \times 10^{14}$ | $1.3 \times 10^{14}$ | $1.3 \times 10^{14}$ | $1.1 \times 10^{14}$ |
| Humid 18 hr/23C/96%RH | $9.2 \times 10^{8}$ | $5.3 \times 10^{11}$ | $8.0 \times 10^{11}$ | $5.8 \times 10^{11}$ | $8.9 \times 10^{11}$ | $1.7 \times 10^{12}$ | $1.0 \times 10^{12}$ |

EXAMPLE V

The asbestos electrical paper product of 82% chrysotile fiber, 8% polyester fiber and 10% terpolymer latex both untreated and subjected to a heat treatment pursuant to this invention was evaluated and compared with competitive insulating materials comprising kraft paper, polyester film (DuPont's Mylar) and polyamide fiber paper, (DuPont's Nomex), and each tested under a series of identical conditions including TAPPI T461 flammability under direct flame conditions, moified Underwriter Laboratories' Inc. hot wire ignition test for plastics used in electrical applications specified in Bulletin No. 55, and ASTM D-495 arc resistance. The flame resistance and arc resistance test were performed pursuant to TAPPI T-461 and ASTM D-495 (using tungsten rod electrode) procedures respectively. However, the Underwriter Laboratories' Bulletin No. 55 (Burning, Arcing, Ignition and Tracking of Plastics used in Electrical Applications) test with hot wire ignition was modified so as to evaluate flexible layer insulation in a simulated coil configuration with a heating wire dissipation of 75 watts. The changes introduced into the test were as follows: a 6 × ½ × ¼ in. asbestos-cement bar was substituted for the plastic bars normally employed and these were wrapped in metal foil to provide for measuring the voltage on the wire after it burned through the test material. Also, nichrome wire (0.0226 in. diameter, 1,355 ohms/ft.) was substituted for no. 24 iron wire. The test specimen was relocated from the low voltage portion of the circuit to the high voltage portion in order to provide maximum available voltage stress on the material during the test (60 to 65 volts). Since none of the samples burst into flame during testing, a volt meter was connected from the metal foil covering the asbestos cement bars to the return lead of the circuit. The meter indicated in conjunction with the timer when the test material burned or melted through.

The samples of materials tested according to the foregoing comprise the following.

1. kraft paper, 5 mils in thickness,
2. polyester film, 2 mils thick, DuPont's Mylar
3. asbestos paper, 3 mils thick, heat treated for 4 hours at 175°C
4. asbestos paper, no heat treatment
5. polyamide paper, 3 mils thick, DuPont's Nomex fiber, type 410

The hot wire test and arc resistance under identical conditions for all five samples resulted in the following:

TABLE 6

| Sample | Layered Test Thickness, mil | Melt or Burn Through Time, sec | Arc Resistance sec |
|---|---|---|---|
| 1. Kraft paper | 20 | 12–14 (Sparks, smoke no flame) | 24 |
| 2. Polyester film | 20 | 2–5 (Melted) | 70 |
| 3. Asbestos paper Heat Treated | 21 | >300 (Slight Smoke) | 125 |
| 4. Asbestos paper As Received | 21 | >300 (Smoke) | 125 |
| 5. Polyamide fiber paper | 21 | 42–45 (Slight Smoke, (87) Melt, Char) | 79 |

The flame test results of each sample were as follows:

TABLE 7

| Sample | Flame Height, in. | Char Length, in. | After Glow |
|---|---|---|---|
| Kraft paper | 8¼ (Quickly Burned) | 8¼ | Yes. 10–15 sec |
| Polyester fiber | 4 (Melted, No flame) | No char | No |
| Asbestos paper Heat Treated | 2½ (Momentary Flame) | ¼ | No |
| Asbestos paper As received | 8¼ (Burned Moderately) | ⅛ | No |
| Polyamide fiber paper | ¾(Momentary Flame) | ¾ | No |

The following examples illustrate the effectiveness of the heat treatment of this invention when administered over only very brief, and economical, periods of a minute or more. In each of Examples 6 and 7, the materials treated consisted of sheets of asbestos paper comprised of 90% by weight of chrysotile asbestos fiber and 10% by weight of the terpolymer of acrylonitrile-butadiene-styrene and of an average thickness of 7 mils.

EXAMPLE VI

The above asbestos-terpolymer paper samples where heat treated in an atmosphere of ordinary air for the given periods, and the dielectric constant, dissipation factor and volume resistivity of initial or untreated paper samples and of samples treated for the specified terms were all measured after exposure to standardizing conditions at 50% relative humidity at 23°C for 65 hrs. The results were as follows:

Table 8

| Time at 250°C | K,60 Hz | D,60 Hz | VR,ohm-cm |
|---|---|---|---|
| Standard-untreated | 15.5 | 0.796 | $3.41 \times 10^{9}$ |
| 1 min. | 4.96 | 0.20 | $3.3 \times 10^{13}$ |
| 2 min. | 3.87 | 0.159 | $7.4 \times 10^{13}$ |
| 4 min. | 3.42 | 0.141 | $7.9 \times 10^{13}$ |
| 10 min. | 3.30 | 0.137 | $6.74 \times 10^{13}$ |
| 20 min. | 3.80 | 0.147 | $6.64 \times 10^{13}$ |

In the above and following tables, K represents dielectric constant at 60Hz determined by ASTM-D150 standards, D represents dissipation factor at 60Hz determined by ASTM-D150standards, and VR represents volume resistivity in ohm-cm determined by ASTM-D257 standards under the same conditions as previously stated, each unless indicated otherwise.

EXAMPLE VII

The same paper of chrysotile and the terpolymer was heat treated and evaluated pursuant to identical conditions as in example VI except that the thermal conditions were at a temperature of 175°C rather than 258°C. The data resulting therefrom were:

Table 9

| Time at 175°C | K | D | VR |
|---|---|---|---|
| Standard-untreated | 15.5 | 0.796 | $3.41 \times 10^{9}$ |
| 15 min. | 4.74 | 0.191 | $4.0 \times 10^{13}$ |
| 0.5 hr. | 3.82 | 0.153 | $8.0 \times 10^{13}$ |
| 1.0 hr. | 3.60 | 0.141 | $7.3 \times 10^{13}$ |
| 1.5 hr. | 3.46 | 0.141 | $6.4 \times 10^{13}$ |
| 2.0 hr. | 3.92 | 0.144 | $4.6 \times 10^{13}$ |

EXAMPLE VIII

The material utilized in this test was an asbestos paper composed of 82% by weight chrysotile asbestos fiber, 10% by weight of the terpolymer of acrylonitrile-butadiene-styrene, and 8% reinforcing polyester fiber. The standard and samples treated at 120°C were each evaluated following conditioning by exposure to humidity conditions of 96 hr, at 23°C and 50% relative humidity. The following values were obtained.

Table 10

| Time at 120°C | K | D | VR |
|---|---|---|---|
| Standard-untreated | 16.0 | 0.768 | $3.41 \times 10^{9}$ |
| 4 hr. | 8.0 | 0.295 | $2.39 \times 10^{11}$ |
| 8 hr. | 6.57 | 0.211 | $4.26 \times 10^{12}$ |
| 16 hr. | 5.50 | 0.187 | $2.68 \times 10^{13}$ |
| 24 hr. | 4.62 | 0.166 | $4.11 \times 10^{13}$ |
| 28 hr. | 4.26 | 0.156 | $5.14 \times 10^{13}$ |

EXAMPLE IX

This evaluation employed the same test conditions and samples of the same asbestos material and the same test conditions as employed in previous Example VIII, except as indicated otherwise, with the material heated to a temperature of 175°C. The term of heating and effect upon electrical properties were:

Table 11

| Time at 175°C | K | D | VR |
|---|---|---|---|
| Standard-untreated | 16.0 | 0.768 | $3.41 \times 10^{9}$ |
| 0.5 hr. | 6.0 | 0.206 | $1.02 \times 10^{13}$ |
| 1.0 hr. | 5.42 | 0.195 | $2.33 \times 10^{13}$ |
| 1.5 hr. | 3.98 | 0.157 | $5.34 \times 10^{13}$ |
| 4.0 hr. | 3.84 | 0.149 | $7.9 \times 10^{13}$ |
| 6.0 hr. | 3.83 | 0.147 | $7.13 \times 10^{13}$ |

However, upon further conditioning of the untreated sample and that subjected to a 4 hour test of 175°C temperature, under a very high relative humidity of 96% at 23°C for 18 hours, a far more pronounced difference in electrical properties was exhibited, to wit: the untreated material had a K of 22.5 and D of 2.41 whereas the material treated for 4 hrs. at 175°C then had a K of 5.99, D of 0.364 and VR of $7.2 \times 10^{11}$. The necessity of an oxidizing atmosphere during the application of the heat treatment to the asbestos and vinyl-containing polymeric material is established by the results of the following test carried out in a nitrogen atmosphere.

EXAMPLE X

Samples of asbestos paper, the same product and of the same composition as the material employed in Examples II, III, IV, V, VIII, and IX, were tested both untreated and after heating 4 hrs. at 175°C within each an atmosphere of air, pure nitrogen, and successively nitrogen and then air. The thus variously heat treated materials exhibited electrical and physical properties as indicated:

Table 12

| Sample | K | D | VR | Physical Appearance |
|---|---|---|---|---|
| Standard-untreated 48hr/23°C/50RH | 8.3 | 0.47 | $1.4 \times 10^{10}$ | Blue-grey in color Very limp |
| Heated in air 4 hours at 175°C 1hr/23°C/50RH | 3.1 | 0.126 | $1.1 \times 10^{14}$ | Tan in color Stiff |
| Heated in $N_2$ 4 hours at 175°C 1 hr/23°C/50RH | 3.9 | 0.184 | $4.4 \times 10^{12}$ | Blue-grey in color very limp |
| Heated in $N_2$ 4 hours at 175°C, then heated in air | | | | |

Table 12-continued

| Sample | K | D | VR | Physical Appearance |
|---|---|---|---|---|
| 4 hrs. at 175°C 1hr/23°C/50RH | 2.1 | 0.117 | $1.4 \times 10^{14}$ | Tan in color Stiff |
| Standard-untreated 18hr/23°C/91RH | 33.0 | 2.1 | $6.8 \times 10^{8}$ | Blue-grey in color Very limp |
| Heated in air 4 hours at 175°C 18hr/23°C/91RH | 4.3 | 0.246 | $5.1 \times 10^{12}$ | Tan in color Stiff |
| Heated in $N_2$ 4 hours at 175°C 18hr/23°C/91RH | 7.3 | 0.63 | $9.4 \times 10^{9}$ | Blue-grey in color Very limp |
| Heated in $N_2$ 4 hours at 175°C then heated in air 4 hrs. at 175°C 18hr/23°C/91RH | 3.0 | 0.174 | $9.9 \times 10^{12}$ | Tan in color Stiff |

EXAMPLES IX–XV

The following series of examples demonstrate the effectiveness of the measures of this invention with paper composed of a variety of diverse materials including the asbestos component as well as the vinyl-containing polymer. In each example, unless specified otherwise, the samples were composed of about 90% by weight of asbestos fiber of the identified class and about 10% by weight of the given polymer, and all samples were subjected to 3 hours at 175°C within an oxidizing atmosphere of ambient air. Testing of electrical properties of both the untreated and treated samples followed their conditioning for 2 days at 23°C and 50% relative humidity. The combination of asbestos and vinyl-containing polymer material and their pretreatment and past heat treatment electrical properties obtained were:

Table 13

| Example | Sample Material | Volume Resistivity, ohm-cm Untreated | Treated |
|---|---|---|---|
| 11 | chrysotile fiber with copolymer of butadiene styrene. Uniroyal N-2758 Latex | $1.96 \times 10^{8}$ | $3.51 \times 10^{11}$ |
| 12 | chrysotile fiber with vinyl chloride copolymer National Starch Vynallor 250 | $4.2 \times 10^{8}$ | $1.22 \times 10^{10}$ |
| 13 | chrysotile fiber with chloroprene latex Dupont's 736 latex | $3.7 \times 10^{8}$ | $6.6 \times 10^{9}$ |
| 14 | chrysotile fiber and copolymer of butadiene-styrene and terpolymer with carboxylated cross-linking agent Uniroyal J-3595 | $10^{6}$ | $1.46 \times 10^{11}$ |
| 15 | anthophyllite fiber with terpolymers of acrylonitrile-butadiene-styrene and 8% of polyester reinforcing fiber | $1.86 \times 10^{13}$ | $6.7 \times 10^{14}$ |

EXAMPLE XVI

Samples of chrysotile fiber with the terpolymer binder of acrylonitrile-butadiene-styrene with about 8% polyester reinforcing fiber were also subjected to the treatment of 3 hours at 175°C within an air atmosphere devoid of moisture. The untreated material exhibited a volume resistivity of $6.92 \times 10^{10}$ and when so treated in dry air this property was $1.16 \times 10^{14}$, thus establishing that the presence of moisture is not essential.

I claim:

1. A method of enhancing physical and electrical insulating properties of asbestos products which consists essentially of forming a sheet composition consisting of 85–95 weight percent of chrysotile asbestos fiber, 5–15 weight percent of butadiene polymeric binder, and an added 0–25 weight percent of a reinforcement-filler component, said composition containing no curing agent for said butadiene polymeric binder; and thereafter subjecting said sheet composition to a temperature in the range of from 130°C to 200°C in an oxidizing atmosphere for a period of at least one minute such that as compared to the properties of the unheated and non-oxidized sheet composition, the tensile strength, volume resistance, and stiffness of the heated oxidized sheet composition are increased and the dielectric constant and dissipation factor at 60Hz are reduced.

2. The method of claim 1 wherein the combination of chrysotile asbestos fibers and butadiene polymeric material is heated for a period of about 15 minutes up to about 50 hours.

3. The method of claim 2 wherein the combination of chrysotile asbestos fiber and butadiene polymeric binder is heated for a period of at least about one hour.

4. The method of claim 1 wherein the butadiene polymeric binder comprises at least one polymeric material selected from the group consisting of acrylonitrile-butadiene-styrene and butadiene-styrene polymers.

5. The method of claim 1 wherein the non-asbestos filler component comprises reinforcing fiber of organic composition.

6. The method of claim 4 wherein the butadiene polymeric binder is an acrylonitrile-butadiene-styrene polymer.

7. The chrysotile asbestos fiber and butadiene polymeric material heat reaction product of the method of claim 1.

* * * * *